US012608589B2

(12) United States Patent
Makondo et al.

(10) Patent No.: US 12,608,589 B2
(45) Date of Patent: Apr. 21, 2026

(54) DETECTING AND CORRECTING KNOWLEDGE BASE ERRORS

(71) Applicant: INTERNATIONAL BUSINESS MACHINES CORPORATION, Armonk, NY (US)

(72) Inventors: Ndivhuwo Makondo, Pretoria (ZA); Francois Pierre Luus, Wierdapark (ZA); Naweed Aghmad Khan, Johannesburg (ZA); Ismail Yunus Akhalwaya, Emmarentia (ZA); Ryan Nelson Riegel, Carrollton, GA (US); Oarabile Hope Moloko, Mahikeng (ZA); Thabang Doreen Lebese, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 17/807,909

(22) Filed: Jun. 21, 2022

(65) Prior Publication Data

US 2023/0409872 A1      Dec. 21, 2023

(51) Int. Cl.
*G06N 3/042* (2023.01)
*G06N 5/046* (2023.01)

(52) U.S. Cl.
CPC ............. *G06N 3/042* (2023.01); *G06N 5/046* (2013.01)

(58) Field of Classification Search
CPC ........ G06N 20/00; G06N 3/042; G06N 3/045; G06N 3/084; G06N 5/025; G06N 5/046
See application file for complete search history.

(56) References Cited

U.S. PATENT DOCUMENTS

| | | | |
|---|---|---|---|
| 10,013,450 B2 | 7/2018 | Clark | |
| 2010/0198831 A1 | 8/2010 | Feng | |
| 2013/0117202 A1 | 5/2013 | Malka | |
| 2013/0117219 A1 | 5/2013 | Malka | |
| 2017/0177651 A1 | 6/2017 | Ellis | |
| 2017/0228402 A1 | 8/2017 | Kumar | |

(Continued)

FOREIGN PATENT DOCUMENTS

ZA      202212627 B      7/2023

OTHER PUBLICATIONS

Riegel et al., "Logical Neural Networks", Jun. 23, 2020, arXiv:2006. 13155v1, pp. 1-48. (Year: 2020).*

(Continued)

*Primary Examiner* — Brent Johnston Hoover

(74) *Attorney, Agent, or Firm* — Edward J. Wixted, III

(57)      ABSTRACT

A computer-implemented method may include processors configured for receiving input data corresponding to a knowledge base comprising a plurality of propositional logic clauses, generating output data corresponding to a first set of logical rules and a first set of facts based on the plurality of propositional logic clauses, accumulating the first set of facts to generate accumulated facts, generating a model graph based on the accumulated facts and the first set of logical rules, alternating reasoning and learning passes at the model graph until convergence to generate a second set of logical rules and a second set of facts, and generating a third set of logical rules and a third set of facts, wherein the third set of logical rules and the third set of facts exceed a first predetermined threshold.

20 Claims, 4 Drawing Sheets

(56) References Cited

U.S. PATENT DOCUMENTS

2018/0300649 A1    10/2018  Lee
2019/0026638 A1     1/2019  Zhang
2022/0351059 A1 *  11/2022  Hoang ..................... G06N 3/09

OTHER PUBLICATIONS

Qian et al., "Logical Credal Networks", Sep. 25, 2021, arXiv:2109. 12240v1, pp. 1-11. (Year: 2021).*

Chen et al., "Neural symbolic reasoning with knowledge graphs: Knowledge extraction, relational reasoning, and inconsistency checking", Fundamental Research I (2021), 9 pages, <https://www. sciencedirect.com/science/article/pii/S266732582100159X>.

Chen et al., "Correcting Knowledge Base Asertions." ArXiv, Cornell University, arXiv:2001.06917, Jan. 19, 2020, 12 pages, <https:// arxiv.org/abs/2001.06917>.

Galarraga et al., "AMIE: Association Rule Mining under Incomplete Evidence in Ontological Knowledge Bases", Proceedings of the International World Wide Web Conference Committee (IW3C2), May 13-17, 2013, Rio de Janeiro, Brazil, 11 pages, <https://www. researchgate.net/publication/262245682>.

Hogan et al. "Knowledge Graphs." arXiv, Cornell University, arXiv 2003.02320, Sep. 11, 2021, 135 pages, <https://arxiv.org/pdf/2003. 02320.pdf>.

Melo et al., "An Approach to Correction of Erroneous Links in Knowledge Graphs", Proceedings of the 9th International Conference on Knowledge Capture (K-CAP2017), Dec. 4-6, 2017, Austin, Texas, 4 pages, <https://www.semanticscholar.org/paper/An-Approach-to-Correction-of-Erroneous-Links-in-Melo-Paulheim/32263194f5a58bbe6fdf7710dce723bf6460fdaa>.

Melo et al., "Automatic detection of relation assertion errors and induction of relation constraints", Semantic Web-1 (2020) 1-30, <https://content.iospress.com/articles/semantic-web/sw200369>.

Paulheim, Heiko, "Knowledge graph refinement: A survey of approaches and evaluation methods." Semantic web 8.3 (2017): 489-508, <http://www.semantic-web-journal.net/system/files/swj1167.pdf>.

Riegel et al., "Logical Neural Networks", Arxiv, Cornell University, arXiv:2006.13155, Jun. 23, 2020, 48 pages, <https://arxiv.org/abs/2006.13155>.

Tanon et al., "Learning how to correct a knowledge base from the edit history." Proceedings of the World Wide Web Conference, May 13, 2019, San Francisco, California, 11 pages, <https://thomas.pellissier-tanon.fr/papers/2019-WWW-corhist.pdf>.

Tanon et al., "Neural Knowledge Base Repairs", Proceedings of the European Semantic Web Conference, Jun. 2021 (virtual), Hersonissos, Greece, 17 pages, <https://hal.archives-ouvertes.fr/hal-03325101/>.

* cited by examiner

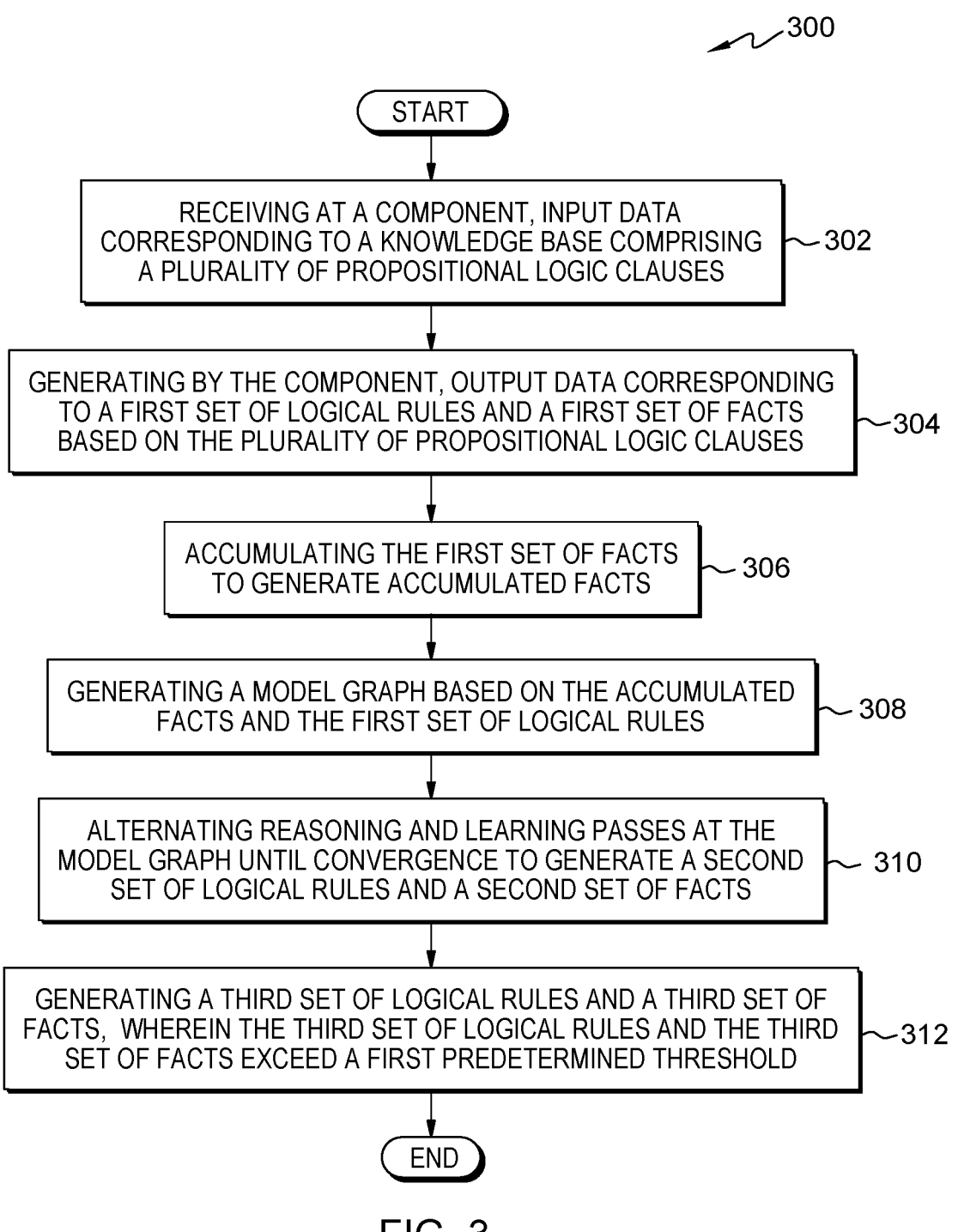

300

START

RECEIVING AT A COMPONENT, INPUT DATA CORRESPONDING TO A KNOWLEDGE BASE COMPRISING A PLURALITY OF PROPOSITIONAL LOGIC CLAUSES — 302

GENERATING BY THE COMPONENT, OUTPUT DATA CORRESPONDING TO A FIRST SET OF LOGICAL RULES AND A FIRST SET OF FACTS BASED ON THE PLURALITY OF PROPOSITIONAL LOGIC CLAUSES — 304

ACCUMULATING THE FIRST SET OF FACTS TO GENERATE ACCUMULATED FACTS — 306

GENERATING A MODEL GRAPH BASED ON THE ACCUMULATED FACTS AND THE FIRST SET OF LOGICAL RULES — 308

ALTERNATING REASONING AND LEARNING PASSES AT THE MODEL GRAPH UNTIL CONVERGENCE TO GENERATE A SECOND SET OF LOGICAL RULES AND A SECOND SET OF FACTS — 310

GENERATING A THIRD SET OF LOGICAL RULES AND A THIRD SET OF FACTS, WHEREIN THE THIRD SET OF LOGICAL RULES AND THE THIRD SET OF FACTS EXCEED A FIRST PREDETERMINED THRESHOLD — 312

END

FIG. 3

DETECTING AND CORRECTING KNOWLEDGE BASE ERRORS

BACKGROUND

The present invention relates generally to the field of knowledge base correction, and more particularly to detecting and correcting errors inherent in knowledge bases using a logical neural network (LNN).

Knowledge bases (KBs) are useful in various applications lie at the centre of the Semantic Web. They are particularly useful for tasks such as word sense disambiguation, machine translation, question answering, dialog, etc. KBs may be used to perform question-answer queries based on a large set of data, wherein the set of data includes logical statements corresponding to facts or other useful information.

SUMMARY

The present invention is described in various embodiments disclosing computer-implemented methods, computer program products, and computer systems for detecting and correcting knowledge base errors. One embodiment of the present disclosure is a computer-implemented method for detecting and correcting knowledge base errors, the computer-implemented method includes one or more processors configured for receiving, at a component, input data corresponding to a knowledge base comprising a plurality of propositional logic clauses. Further, the computer-implemented method may include one or more processors configured for generating, by the component, output data corresponding to a first set of logical rules and a first set of facts based on the plurality of propositional logic clauses. Further, the computer-implemented method may include one or more processors configured for accumulating the first set of facts to generate accumulated facts and generating a model graph based on the accumulated facts and the first set of logical rules. Furthermore, the computer-implemented method may include one or more processors configured for alternating reasoning and learning passes at the model graph until convergence to generate a second set of logical rules and a second set of facts. Even further, the computer-implemented method may include one or more processors configured for generating a third set of logical rules and a third set of facts, wherein the third set of logical rules and the third set of facts exceed a first predetermined threshold.

BRIEF DESCRIPTION OF THE DRAWINGS

FIG. 3 depicts a flowchart of a computer-implemented method for detecting and correcting knowledge base errors, in accordance with an embodiment of the present invention.

DETAILED DESCRIPTION

Figure 1:
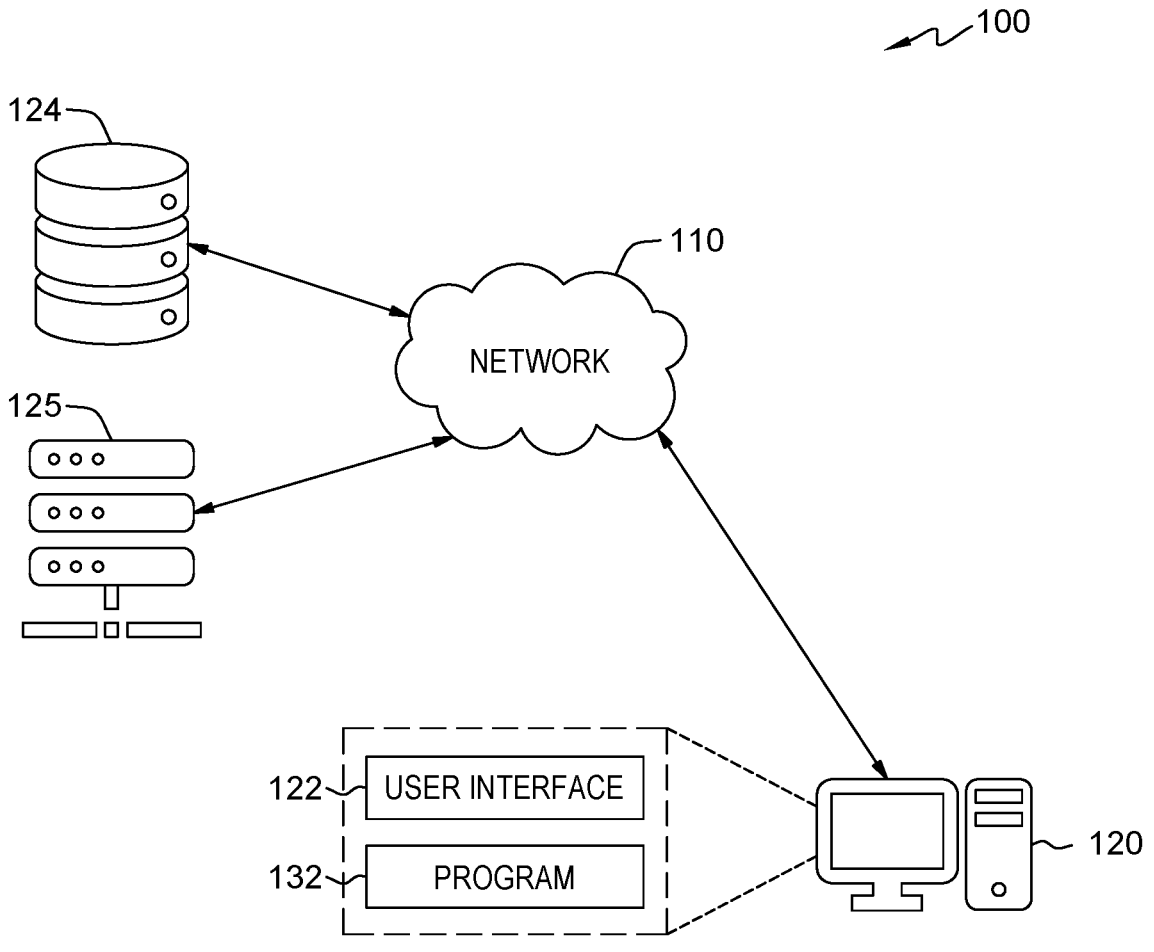
FIG. 1 depicts a block diagram of a distributed network environment for detecting and correcting knowledge base errors, in accordance with an embodiment of the present invention.

Embodiments of the present invention recognize that Knowledge Bases (KBs) are useful in various applications and lie at the centre of the Semantic Web. However, the usefulness and usability of a KB is often limited by quality issues. One common issue is the presence of erroneous assertions (incorrect facts/rules, ambiguities, undetectable misspelling (incorrect homonym)), often caused by lexical or semantic confusion by human annotators. These issues are due to various reasons, including the quality of the knowledge sources (e.g., DBpedia uses Wikipedia data) and the knowledge extraction process itself-some KBs are manually curated (e.g., Cyc), others edited by the crowd (e.g., Freebase and Wikidata), and others are extracted from large-scale, semi-structured web KBs such as Wikipedia (e.g., DBpedia and YAGO) with others automatically extracted from unstructured data such as NELL.

Embodiments of the present invention recognize that a solution to the identified technical problems may include detection and correction of errors inherent in KBs. It is costly and time consuming to manually check for correctness of the data in KBs because KBs can be huge (e.g., Wordnet has over 200000 word-sense pairs). Embodiments described herein may include an unsupervised (or self-supervised) neuro-symbolic learning approach to KB correction that is efficient. This approach is based on the logic extracted from the KB ontological rules. The approach does not require any external, annotated data sets to learn how to detect and correct errors in a KB, but if available can easily be incorporated. Instead, the approach only requires that entities and their relationships in the KB are expressed using a formal logical representation which, in invention embodiments is propositional logic represented by a Logical Neural Network (LNN). The training mechanism of the LNN allows errors in the KB to be detected using inconsistency checking in the logical expressions of the KB. The LNN adjusts its weights on the facts to correct contradictions that may arise due to inconsistencies in the rules or facts.

Embodiments described herein may be configured for the detection and correction of errors inherent in KBs. For example, embodiments described herein may include one or more processors configured to receive a knowledge base and optionally an external labelled dataset aligned with the knowledge base as an input to the system. Further, embodiments described herein may include one or more processors configured to supply logical rules to or extract logical rules from the structure of the knowledge base.

Embodiments described herein may include one or more processors configured to supply facts to or extract facts from the structure of the knowledge base. Further, the one or more processors may be configured to accumulate the facts from the knowledge base to generate accumulated facts.

Embodiments described herein may include one or more processors configured to build a Logical Neural Network (LNN) graph from the knowledge base based on the extracted facts and logical rules. In an embodiment, the LNN may be configured to allow reverse ("downward") inference to compute inference of the truth function and may also be configured to provide inference to truth function via upward-downward algorithm to allow convergence over a finite time. In an embodiment, logic rules (i.e., logic statements) may correspond to syntax trees of neurons, wherein the model graph is a logical neural network comprising neurons corresponding to the plurality of propositional logical clauses, wherein the model graph is configured to provide a 1-to-1 correspondence between the neurons and logical elements represented in the plurality of propositional logical clauses.

Embodiments described herein may be configured for alternating reasoning and learning passes until convergence.

In an embodiment, the one or more processors may be configured for alternating reasoning and learning passes as the model graph until convergence to generate a second set of logical rules corresponding to converged logical rules and a second of facts corresponding to converged facts. For example, during a training phase where the model graph is configured to receive training data, receives the training data, and processes the training data, the one or more processors may be configured to perform the training in two loops (e.g., inner loop, outer loop). In an embodiment, the inner loop of the training phase may be configured to perform reasoning by iteratively tightening bounds until convergence, wherein each inference computation (for any node in the graph) can result in either a tighter bounds or remain the same. In an embodiment, the outer loop of the training phase may be executed after the reasoning has converged, wherein gradient descent may be configured to inform how the parameters of the graph may need to be updated. In this example, the parameters may therefore take a single step towards the optimal solution and the bounds are reset. Thus, the training algorithm may therefore proceed back to the inner loop of the training phase using the new parameter configuration. Thus, this outer loop may be configured to continue until the parameters converge or meet a user specified stopping criteria. In an embodiment, once the parameters have converged, a final reasoning pass (i.e., inner loop) may be executed again to fully reason about the model graph for the given parameters.

Embodiments of the present invention may be configured to optionally compare the converged rules and facts to the original accumulated rules and extract the most likely correct and consistent rules and facts, wherein the most likely correct and consistent rules and facts exceed a predetermined similarity threshold compared to the facts and logical rules represented in the output data.

Embodiments of the present invention may include one or more processors configured for optionally repeating the entire process with the most likely correct and consistent rules and facts as additional inputs to the component (e.g., machine learning model), wherein the output from optionally comparing the converged rules and facts to the original accumulated rules includes updated and most likely correct and consistent rules and facts and will be even more correct than the previous iteration.

The present invention will now be described in detail with reference to the Figures.

FIG. 1 depicts a block diagram of a distributed network environment 100 for detecting and correcting knowledge base errors, in accordance with an embodiment of the present invention. FIG. 1 provides only an illustration of one embodiment of the present invention and does not imply any limitations with regard to the environments in which different embodiments may be implemented. Distributed network environment 100 represents a computer system for detecting and correcting knowledge base errors. In the depicted embodiment, the distributed network environment 100 includes computing device 120 in communication with network 110. Distributed network environment 100 may include database(s) 124 and server(s) 125 in communication with network 110. Distributed network environment 100 may also include additional servers, computers, sensors, or other devices not shown.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120. It is further understood that in some embodiments network 110 is optional and the distributed data processing environment 100 for detecting and correcting knowledge base errors can operate as a stand-alone system, where in other embodiments, network 110 may be configured to enable computing device 120 to share a joint database using network 110.

User interface 122 operates as a local user interface on computing device 120 through which one or more users of computing device 120 interact with computing device 120. In some embodiments, user interface 122 is a local app interface of program 132 (e.g., software configured to execute the steps of the invention described herein) on computing device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from the program via network 110. In an embodiment, user interface 122 enables a user to transmit and receive data (i.e., to and from the program via network 110, respectively). In an embodiment, user interface 122 enables a user to execute instructions within the program, input data, and receive information.

Database 124 may operate as a repository for data associated with server 125, computing device 120, and other data transmitted within network 110. A database is an organized collection of data. Database 124 can be implemented with any type of storage device capable of storing data and configuration files that can be accessed and utilized by computing device 120, such as a database server, a hard disk drive, or a flash memory. In an embodiment, database 124 is accessed by computing device 120 to store data corresponding to a knowledge base or logical rules associated with a LNN. In another embodiment, database 124 is accessed by computing device 120 to access knowledge base data, device data, network data, and data corresponding to a propositional or first order logic knowledge base. In another embodiment, database 124 may reside elsewhere within distributed network environment 100 provided database 124 has access to network 110

Database 124 can be implemented with any type of storage device capable of storing data and configuration files that can be accessed and utilized by either of computing device 120, such as a database server, a hard disk drive, or a flash memory. In an embodiment, database 124 may be accessed by computing device 120 to store data associated with computing device 120. In another embodiment, database 124 may be accessed by computing device 120 to access data as described herein.

Database 124 may also operate as a repository for data flowing through network 110. Examples of data include knowledge base data, device data, network data, external labeled dataset data, input data, model input data, output data, model output data, data corresponding to facts and logical rules associated with those facts, and data corresponding to inputs to and outputs from a LNN.

In the depicted embodiment, server(s) 125 may contain program 132 (e.g., software configured to execute the steps of the invention described herein) and database 124. In some embodiments, server(s) 125 can be a standalone computing device(s), a management server(s), a web server(s), a mobile computing device(s), or any other electronic device(s) or computing system(s) capable of receiving, sending, and processing data. In some embodiments, server 125 may be a laptop computer, tablet computer, netbook computer, personal computer (PC), a desktop computer, a smart phone, or any programmable electronic device capable of communicating with computing device 120 via network 110. In other embodiments, server(s) 125 represents a server computing system utilizing multiple computers as a server system, such as a cloud computing environment. In yet other embodiments, server(s) 125 represents a computing system utilizing clustered computers and components (e.g., database server computers, application server computers, etc.) that act as a single pool of seamless resources when accessed within distributed data processing environment 100. Server(s) 125 may include components as described in further detail in FIG. 4.

Computing device 120 may be an electronic device configured for accompaniment with a user. Computing device 120 may be a personal electronic device such as a mobile communications device, smart phone, tablet, personal digital assistant, smart wearable device, personal laptop computer, desktop computer, or any other electronic device configured for user interaction and gathering individual information to generate an individual profile. Computing device 120 may include components as described in further detail in FIG. 4.

Computing device 120 may be configured to be controlled via a software application installed and executed thereon. Computing device 120, when connected to network 110, may convey usage data and other types of data corresponding to the device itself, or other devices connected via network 110, wherein the data may provide insights that are useful within the scope of the designed application.

For computing device 120, a device profile includes, but is not limited to, a user device identifier (ID), a device type (e.g., a smart watch, a smart phone), data usage patterns, and data usage models. Data usage patterns may include data type, data use frequency, and user device data use history. A device profile may be created for computing device 120 connected to network 110 within distributed processing environment 100. Computing device 120 may consider data usage patterns and data usage models in a device profile when determining whether to execute a data usage request by other devices connected to network 110 and within distributed data processing environment 100.

Computing device 120 operates to execute at least a part of the computer program for detecting and correcting knowledge base errors. In an embodiment, computing device 120 may be communicatively coupled with peripheral devices or peripheral devices may be a component of computing device 120. Computing device 120 be configured to send and/or receive data from network 110 and peripheral devices. In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database(s) 124, server(s) 125 via network 110. Computing device 120 may include components as described in further detail in FIG. 4.

Figure 2:
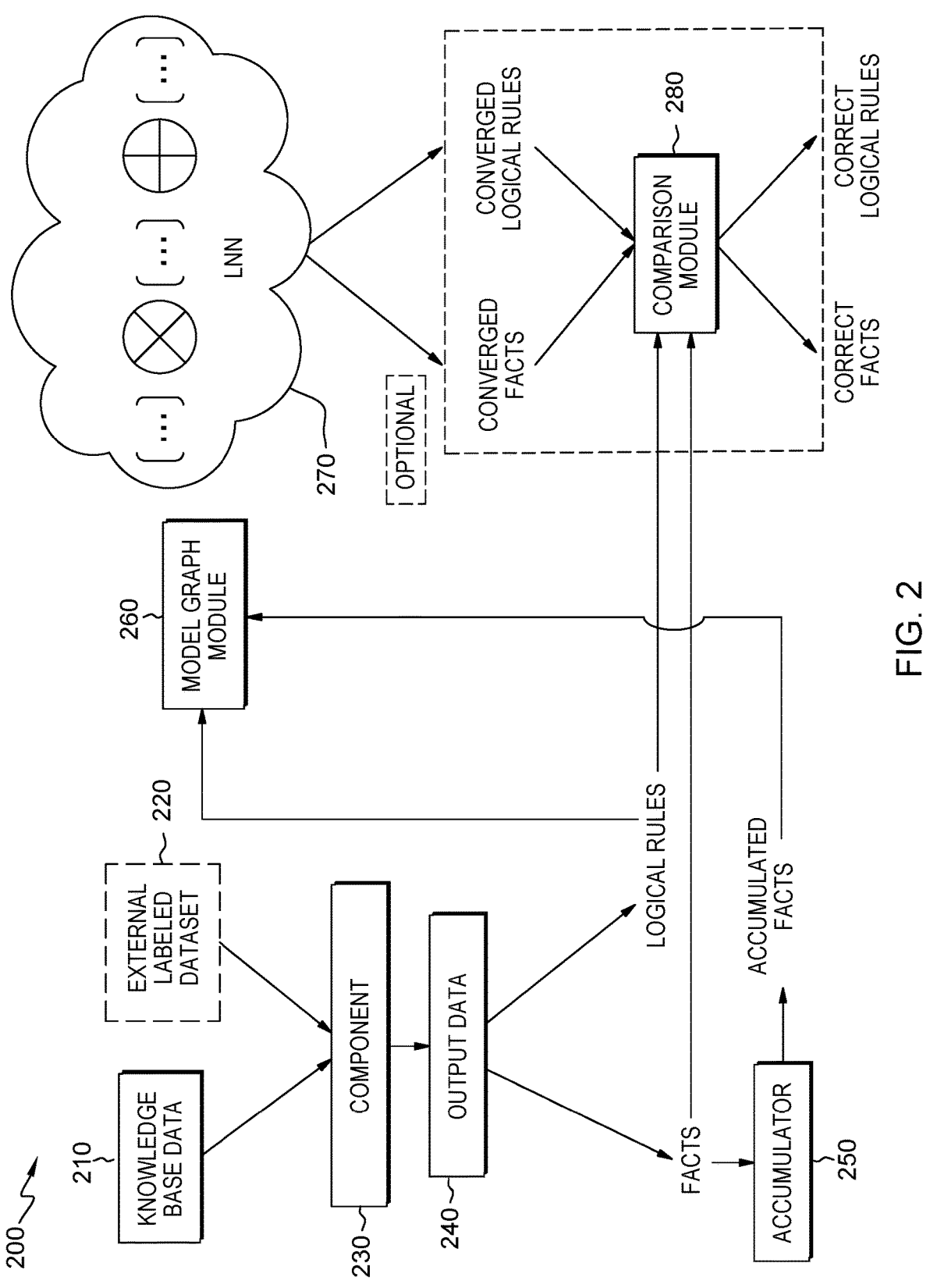
FIG. 2 depicts a system for detecting and correcting knowledge base errors, in accordance with an embodiment of the present invention.

FIG. 2 depicts system 200 for detecting and correcting knowledge base errors, in accordance with an embodiment of the present invention.

In an embodiment, system 200 may include component 230 (e.g., module configured to retrieve facts and rules, machine learning model) configured to receive input data including knowledge base data 210 and/or external labeled dataset 220 aligned with knowledge base data 210. For example, knowledge base data 210 may include a structure corresponding to a plurality of propositional logic clauses including a set of facts and a set of logical rules governing the respective set of facts.

In at least some embodiments, component 230 may implement a trained component or trained model configured to perform the processes described above. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/ algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. A SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

Other machine learning techniques used to train and operate trained components to perform embodiments described herein may include a Logical Neural Network (LNN), which is a form of recurrent neural network with a 1-to-1 correspondence to a set of logical formulae in any of various systems of weighted, real-valued logic, in which evaluation performs logical inference.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Embodiments described herein may include multiple feature selection algorithms to perform automatic feature selection. For example, Pearson correlation filtering, Chi-squared filtering, or Kullback-Leibler divergence may be used to perform automatic feature selection.

Embodiments described herein may include one or more models to choose from for a specific application based on certain application parameters. For example, application parameters may include complexity/simplicity of the problem, computational constraints (e.g., space and time) on training/testing, and problem characteristics (e.g., feature independence/dependence, amount of data noise, stochasticity, stationarity), among others. Each model may have a set of hyper-parameters that may be tuned to optimize training (e.g., feature mapping function, number of hidden neurons).

Embodiments described herein may include various types of machine learning models and techniques for training the machine learning models. For example, supervised learning techniques may be used on shallow models (e.g., SVM, k-nearest neighbor (kNN), random forest, decision tree, naïve Bayes) to serve as a baseline for comparison with deep learning models. Further, embodiments described herein may include performing grid search to fine-tune the hyper-parameters for SVM models, kNN models, or multi-later perceptron (MLP) models.

Embodiments described herein may include deep learning models to emulate the bidirectional-Long Short-Term Memory (LSTM) model to provide state of the art results for Natural Language Processing (NLP) tasks. For example, in a conversational environment, both the front and back halves of a sentence may be analyzed to provide the context to help in determining the meaning or intent of a sentence. Thus, a bidirectional-LSTM may provide improved results in analyzing the sentence in both front and back portions as opposed to a uni-directional LSTM.

In an embodiment, component 230 may be configured to receive input data comprising knowledge base data 210 and/or external labeled dataset 220, process the input data by component 230, and generate output data corresponding to a first set of logical rules and a first set of facts based on the plurality of propositional logic clauses.

In an embodiment, logical rules may be supplied to or extracted from the structure of the knowledge base represented by knowledge base data 210. In another embodiment, logical rules may be supplied to or extracted from external labeled dataset 220. For example, component 230 may be configured to receive input data (e.g., knowledge base data 210, external labeled dataset 220), process, by component 230, the input data, and generate output data 240 corresponding to a set of facts and a set of logical rules. In other words, the set of facts and the set of logic rules may be generated by extracting the set of facts and the set of logic rules from the knowledge base data 210 and/or external labeled dataset 220.

In an embodiment, system 200 may include accumulator 250 configured to accumulate the set of facts from knowledge base data 210 to generate accumulated facts.

In an embodiment, system 200 may include model graph module 260 configured to build or generate a model graph (e.g., LNN graph 270) based on the set of logical rules and the accumulated facts. For example, model graph module 260 may be configured to generate a graphical representation of first order logic statements corresponding to syntax trees representing the accumulated facts with the corresponding first set of logical rules. Further, system 200 may include one or more processors configured to display the graphical representation as the model graph on a user interface of a computing device.

In an embodiment, system 200 may include one or more processors configured for alternating reasoning and learning passes until convergence. For example, the one or more processors may be configured for alternating reasoning and learning passes as the model graph until convergence to generate a second set of logical rules corresponding to converged logical rules and a second of facts corresponding to converged facts.

In an embodiment, system 200 may optionally include comparison module 280 configured to generate a third set of logical rules and a third set of facts based on a comparison with the second set of logical rules and the second set of facts, wherein the third set of logical rules and the third set of facts exceed a first predetermined threshold. For example, comparison module 280 may include one or more processors configured to compare the converged rules and facts to the original accumulated rules and extract the most likely correct and consistent rules and facts, wherein the most likely correct and consistent rules and facts exceed a predetermined similarity threshold compared to the facts and logical rules represented in the output data.

In an embodiment, system 200 may include one or more processors configured to update the knowledge base data 210 to include the third set of logical rules and the third set of facts, and generate a fourth set of logical rules and a fourth set of facts based on a second optional comparison with the third set of logical rules and the third set of facts, wherein the fourth set of logical rules and the fourth set of facts exceed a second predetermined similarity threshold. For example, the one or more processors may be configured to repeat the steps described above herein, but with the addition of the most likely correct and consistent rules and facts included in the input data to component 230, wherein the output from comparison module 280 will correspond to a final set of correct and consistent rules and facts.

FIG. 3 depicts a flowchart of computer-implemented method 300 for detecting and correcting knowledge base errors, in accordance with an embodiment of the present invention.

In an embodiment, computer-implemented method 300 may include one or more processors configured for receiving 302, at a component, input data corresponding to a knowledge base comprising a plurality of propositional logic clauses.

In an embodiment, the input data corresponding to the knowledge base may include an external labeled dataset aligned with the knowledge base.

In an embodiment, computer-implemented method 300 may include one or more processors configured for generating 304, by the component, output data corresponding to a first set of logical rules and a first set of facts based on the plurality of propositional logic clauses. For example, generating 304 output data may include one or more processors configured for receiving, at the component, the input data, processing, by the component, the input data to identify each of the plurality of propositional logic clauses, extracting, by the component, the first set of logical rules and the first set of facts from the plurality of propositional logic clauses, and transmitting, by the component, the first set of logical rules and the first set of facts as the output data.

In an embodiment, computer-implemented method 300 may include one or more processors configured for accumulating 306 the first set of facts to generate accumulated facts.

In an embodiment, computer-implemented method 300 may include one or more processors configured for generating 308 a model graph based on the accumulated facts and the first set of logical rules. For example, generating 308 the model graph may further include one or more processors configured for generating, by one or more processors, a graphical representation of first order logic statements corresponding to syntax trees representing the accumulated facts with the corresponding first set of logical rules, and displaying, by one or more processors, the graphical representation as the model graph on a user interface of a computing device.

In an embodiment, computer-implemented method 300 may include one or more processors configured for alternating 310 reasoning and learning passes at the model graph until convergence to generate a second set of logical rules and a second set of facts. For example, alternating 310 reasoning and learning passes at the model graph until convergence may further include one or more processors configured for applying the truth value bounds to the model graph to allow an open world assumption that some of the second set of logical rules and the second set of facts are true even if the second set of logical rules and the second set of facts are not known or provable.

In an embodiment, computer-implemented method 300 may include one or more processors configured for generating 312 a third set of logical rules and a third set of facts based on an optional comparison with the second set of logical rules and the second set of facts, wherein the third set of logical rules and the third set of facts exceed a first predetermined threshold.

In an embodiment, computer-implemented method 300 may include one or more processors configured for extracting truth values from the knowledge base and determining truth value bounds based on the truth values.

In an embodiment, computer-implemented method 300 may include one or more processors configured for updating the knowledge base to include the third set of logical rules and the third set of facts and generating a fourth set of logical rules and a fourth set of facts based on an optional comparison with the third set of logical rules and the third set of facts, wherein the fourth set of logical rules and the fourth set of facts exceed a second predetermined threshold.

Figure 4:
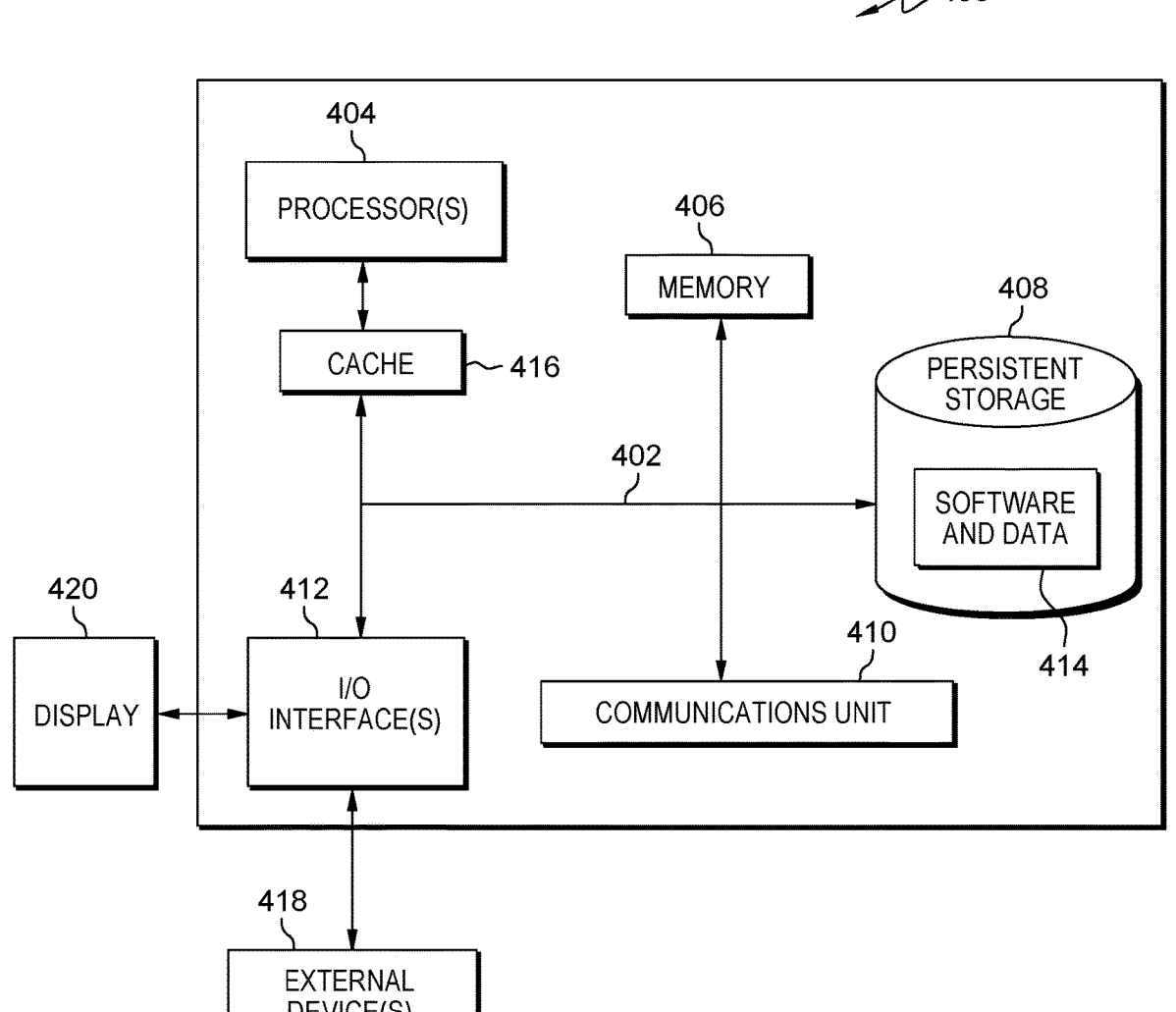
FIG. 4 depicts a block diagram of a computing device of a distributed network environment, in accordance with an embodiment of the present invention.

FIG. 4 depicts a block diagram of a computing device of distributed computing environment, in accordance with an embodiment of the present invention. FIG. 4 depicts a block diagram of computing device 400 suitable for server(s) 125 and computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs, as described herein, may be downloaded to persistent storage 408 through communications unit 410.

I/O interface(s) 412 allows for input and output of data with other devices that may be connected to computing device 120. For example, I/O interface 412 may provide a connection to external devices 418 such as a keyboard, a keypad, a touch screen, and/or some other suitable input device. External devices 418 can also include portable computer readable storage media such as, for example, thumb drives, portable optical or magnetic disks, and memory cards. Software and data 414 used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Predictive model or predictive algorithm described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

receiving, by one or more processors, input data corresponding to a knowledge base, the input data including a plurality of propositional logic clauses;

generating, by one or more processors, output data corresponding to a first set of logical rules and a first set of facts based on the plurality of propositional logic clauses;

accumulating, by one or more processors, the first set of facts to generate accumulated facts;

generating, by one or more processors, a logical neural network (LNN) graph based on the accumulated facts and the first set of logical rules, wherein the LNN graph comprises neurons corresponding to the plurality of propositional logic clauses and provides one-to-one correspondence between the neurons and logical elements represented in the plurality of propositional logic clauses;

alternating, by one or more processors, reasoning and learning passes at the LNN graph until convergence to generate a second set of logical rules and a second set of facts;

generating, by one or more processors, a third set of logical rules and a third set of facts, wherein the third set of logical rules and the third set of facts exceed a first predetermined threshold; and correcting, by one or more processors, errors in the knowledge base by updating the knowledge base to include the third set of logical rules and the third set of facts.

2. The computer-implemented method of claim 1, wherein the input data corresponding to the knowledge base further comprises an external labeled dataset aligned with the knowledge base.

3. The computer-implemented method of claim 1, wherein generating the output data further comprises:

receiving, by one or more processors, the input data;

processing, by one or more processors, the input data to identify each of the plurality of propositional logic clauses;

extracting, by one or more processors, the first set of logical rules and the first set of facts from the plurality of propositional logic clauses; and transmitting, by one or more processors, the first set of logical rules and the first set of facts as the output data.

4. The computer-implemented method of claim 1, wherein generating the LNN graph further comprises:

generating, by one or more processors, a graphical representation of first order logic statements corresponding to syntax trees representing the accumulated facts with the corresponding first set of logical rules; and displaying, by one or more processors, the graphical representation as the LNN graph on a user interface of a computing device.

5. The computer-implemented method of claim 1, further comprising:

extracting, by one or more processors, truth values from the knowledge base; and determining, by one or more processors, truth value bounds based on the truth values.

6. The computer-implemented method of claim 5, wherein alternating the reasoning and learning passes at the LNN graph until convergence further comprises:

applying, by one or more processors, the truth value bounds to the LNN graph to allow an open world assumption that some of the second set of logical rules and the second set of facts are true even if the second set of logical rules and the second set of facts are unknown and unprovable.

7. The computer-implemented method of claim 1, further comprising:

generating, by one or more processors, a fourth set of logical rules and a fourth set of facts, wherein the fourth set of logical rules and the fourth set of facts exceed a second predetermined threshold.

8. The computer-implemented method of claim 1, wherein alternating the reasoning and the learning passes at the LNN graph until convergence comprises:

receiving, by one or more processors, training data; and processing, by one or more processors, the training data by:

performing, by one or more processors, the reasoning by iteratively tightening bounds until convergence, wherein each inference computation, for any node in the LNN graph, results in a selection from the group consisting of: a tighter bounds and remain same; and subsequent to performing the reasoning, performing, by one or more processors, gradient descent to inform how parameters of the LNN graph are to be updated.

9. A computer program product comprising:

one or more computer readable storage media; and program instructions stored on the one or more computer readable storage media to perform operations comprising:

receiving input data corresponding to a knowledge base, the input data including a plurality of propositional logic clauses;

generating output data corresponding to a first set of logical rules and a first set of facts based on the plurality of propositional logic clauses;

accumulating the first set of facts to generate accumulated facts;

generating a logical neural network (LNN) graph based on the accumulated facts and the first set of logical rules, wherein the LNN graph comprises neurons corresponding to the plurality of propositional logic clauses and provides one-to-one correspondence between the neurons and logical elements represented in the plurality of propositional logic clauses;

alternating reasoning and learning passes at the LNN graph until convergence to generate a second set of logical rules and a second set of facts;

generating a third set of logical rules and a third set of facts, wherein the third set of logical rules and the third set of facts exceed a first predetermined threshold; and correcting errors in the knowledge base by updating the knowledge base to include the third set of logical rules and the third set of facts.

10. The computer program product of claim 9, wherein the input data corresponding to the knowledge base further comprises an external labeled dataset aligned with the knowledge base.

11. The computer program product of claim 9, wherein the generating the output data further comprises:

receiving the input data;

processing the input data to identify each of the plurality of propositional logic clauses;

extracting the first set of logical rules and the first set of facts from the plurality of propositional logic clauses; and transmitting the first set of logical rules and the first set of facts as the output data.

12. The computer program product of claim 9, wherein the generating the LNN graph further comprises:

generating a graphical representation of first order logic statements corresponding to syntax trees representing the accumulated facts with the corresponding first set of logical rules; and displaying the graphical representation as the LNN graph on a user interface of a computing device.

13. The computer program product of claim 9, wherein the operations further comprise:

extracting truth values from the knowledge base; and determining truth value bounds based on the truth values.

14. The computer program product of claim 13, wherein alternating the reasoning and learning passes at the LNN graph until convergence further comprises:

applying the truth value bounds to the LNN graph to allow an open world assumption that some of the second set of logical rules and the second set of facts are true even if the second set of logical rules and the second set of facts are unknown and unprovable.

15. The computer program product of claim 9, wherein the operations further comprise:

generating a fourth set of logical rules and a fourth set of facts, wherein the fourth set of logical rules and the fourth set of facts exceed a second predetermined threshold.

16. A computer system comprising:

a processor set;

one or more computer readable storage media; and program instructions stored on the one or more computer readable storage media to cause the processor set to perform operations comprising:

receiving input data corresponding to a knowledge base, the input data including a plurality of propositional logic clauses;

generating output data corresponding to a first set of logical rules and a first set of facts based on the plurality of propositional logic clauses;

accumulating the first set of facts to generate accumulated facts;

generating a logical neural network (LNN) graph based on the accumulated facts and the first set of logical rules, wherein the LNN graph comprises neurons corresponding to the plurality of propositional logic clauses and provides one-to-one correspondence between the neurons and logical elements represented in the plurality of propositional logic clauses;

alternating reasoning and learning passes at the LNN graph until convergence to generate a second set of logical rules and a second set of facts;

generating a third set of logical rules and a third set of facts, wherein the third set of logical rules and the third set of facts exceed a first predetermined threshold; and correcting errors in the knowledge base by updating the knowledge base to include the third set of logical rules and the third set of facts.

17. The computer system of claim 16, wherein the input data corresponding to the knowledge base further comprises an external labeled dataset aligned with the knowledge base.

18. The computer system of claim 16, wherein the generating the output data further comprises:

receiving the input data;

processing the input data to identify each of the plurality of propositional logic clauses;

extracting the first set of logical rules and the first set of facts from the plurality of propositional logic clauses; and transmitting the first set of logical rules and the first set of facts as the output data.

19. The computer system of claim 16, wherein the generating the LNN graph further comprises:

generating a graphical representation of first order logic statements corresponding to syntax trees representing the accumulated facts with the corresponding first set of logical rules; and displaying the graphical representation as the LNN graph on a user interface of a computing device.

20. The computer system of claim 15, wherein the operations further comprise:

extracting truth values from the knowledge base; and determining truth value bounds based on the truth values, wherein alternating the reasoning and learning passes at the LNN graph until convergence further comprises:

applying the truth value bounds to the LNN graph to allow an open world assumption that some of the second set of logical rules and the second set of facts are true even if the second set of logical rules and the second set of facts are not known or provable.

* * * * *